US012603576B2

(12) United States Patent
Li et al.

(10) Patent No.: US 12,603,576 B2
(45) Date of Patent: Apr. 14, 2026

(54) SWITCHING POWER CONVERTER CONTROLLER FOR DIGITAL CONTROL OF CONSTANT-POWER MODE

(71) Applicant: RENESAS DESIGN NORTH AMERICA INC., Campbell, CA (US)

(72) Inventors: Tao Li, Campbell, CA (US); Yimin Chen, Campbell, CA (US); Juyoung Yoon, Campbell, CA (US)

(73) Assignee: RENESAS DESIGN NORTH AMERICA INC., Campbell, CA (US)

( * ) Notice: Subject to any disclaimer, the term of this patent is extended or adjusted under 35 U.S.C. 154(b) by 277 days.

(21) Appl. No.: 18/331,078

(22) Filed: Jun. 7, 2023

(65) Prior Publication Data

US 2024/0413758 A1 Dec. 12, 2024

(51) Int. Cl.
*H02M 3/335* (2006.01)

(52) U.S. Cl.
CPC ............................... *H02M 3/33523* (2013.01)

(58) Field of Classification Search
CPC ........... H02M 3/33507; H02M 1/0003; H02M 1/0012; H02M 1/0016; H02M 3/33515
See application file for complete search history.

(56) References Cited

U.S. PATENT DOCUMENTS 9,019,729 B2 * 4/2015 Kleinpenning ......... H02M 3/24
363/21.16
10,015,434 B2 * 7/2018 Yang ...................... H05B 45/24

FOREIGN PATENT DOCUMENTS

JP 2001286140 A 8/2010
JP 2014050255 A 8/2016

OTHER PUBLICATIONS

German Office Action issued on Jan. 10, 2024 in German Patent Application No. 102023206984.9.

* cited by examiner

*Primary Examiner* — Kyle J Moody
(74) *Attorney, Agent, or Firm* — Haynes and Boone, LLP

(57) ABSTRACT
A switching power converter is provided with digital control of a constant-power mode. During the constant-power mode, the switching power converter may approximate an analog constant-power mode by incrementing or decrementing the output voltage by discrete voltage steps. At each discrete voltage step, the output current may vary within a range while the output voltage is kept constant. Alternatively, the switching power converter may approximate an analog constant-power mode by incrementing or decrementing the output current by discrete current steps. At each discrete current step, the output voltage may vary within a range while the output current is kept constant.

20 Claims, 11 Drawing Sheets

300

-- Prior Art --

SWITCHING POWER CONVERTER CONTROLLER FOR DIGITAL CONTROL OF CONSTANT-POWER MODE

TECHNICAL FIELD

This application relates to switching power converters, and more particularly to a switching power converter controller for digital control of a constant-power mode.

BACKGROUND

Depending upon the output voltage and the output current, a switching power converter may transition between a constant-voltage mode and a constant-current mode such as during the charging of a battery. An example of this transition between the constant-current and constant-voltage modes is shown in FIG. 1. During the constant-voltage mode, the output current is below a maximum value (Imax) while the output voltage is regulated to equal a constant value Vmax. Should the output current increase to equal or exceed Imax during the constant-voltage mode, the switching power converter transitions to the constant-current mode. Conversely, if the output voltage increases to equal or exceed Vmax during the constant-current mode, the switching power converter transitions to the constant-voltage mode.

To further enhance battery charging, switching power converters with a constant-power mode have been developed. In a constant-power-mode-enabled switching power converter, there is no direct transition between the constant-voltage and constant-current modes as shown in FIG. 1. Instead, the switching power converter transitions to either the constant-voltage or constant-current modes from a constant-power mode. An example of the transitions between the constant-voltage, constant-power, and constant-current modes is shown in FIG. 2. During the constant-voltage mode, the switching power converter regulates the output voltage to equal a constant value Vmax while the output current is less than a maximum value IP1. When the output current equals or exceeds IP1, the switching power converter transitions to the constant-power mode at a point P1. During the constant-power mode, the switching power converter reduces the output voltage in response to an increase in the output current such that a product of the output voltage and the output current results in a constant output power. Conversely, the switching power converter increases the output voltage in response to an decrease in the output current to again maintain the constant output power. Should the output voltage fall to be equal to or less than a minimum voltage value VP2 during the constant-power mode, the switching power converter transitions to the constant-current mode at a point P2.

Although the use of the constant-power mode enhances battery charging, the control methodology has proven to be complex to implement. Accordingly, there is a need in the art for improved constant-power operation.

SUMMARY

In accordance with an aspect of the disclosure, a switching power converter is provided that includes: a transformer having a primary winding and a secondary winding, wherein the secondary winding is coupled to an output node for an output voltage; a power switch in series with the primary winding; and a controller configured to: control a cycling of the power switch to regulate the output voltage to equal a maximum voltage during a constant-voltage mode; transition from the constant-voltage mode to a constant-power mode in response to the output current being greater than a maximum current of the constant-voltage mode; and control the cycling of the power switch to regulate the output voltage to equal a first constant voltage while an output current of the switching power converter is within a first current range, wherein the first constant voltage is less than the maximum voltage by a discrete voltage step, and calculate a first constant-power reference current by a division of a constant power of the constant-power mode by the first constant voltage, wherein the first current range includes the first constant-power reference current.

In accordance with another aspect of the disclosure, a switching power converter is provided that includes: a transformer having a primary winding and a secondary winding, wherein the secondary winding is coupled to an output node for an output voltage; a power switch in series with the primary winding; a controller configured to control a cycling of the power switch so that an output current of the switching power converter equals a constant current during a constant-current mode; transition from the constant-current mode to a constant-power mode in response to the output voltage being greater than a maximum voltage of the constant-current mode; control the cycling of the power switch to regulate the output voltage to equal a first constant voltage while an output current of the switching power converter is within a first current range, wherein the first constant voltage is greater than the maximum voltage by a discrete voltage step, and calculate a first constant-power reference current by a division of a constant power of the constant-power mode by the first constant voltage, wherein the first current range includes the first constant-power reference current.

In accordance with yet another aspect of the disclosure, a switching power converter is provided that includes: a transformer having a primary winding and a secondary winding, wherein the secondary winding is coupled to an output node for an output voltage; a power switch in series with the primary winding; a controller configured to control a cycling of the power switch to regulate the output voltage to equal a maximum voltage during a constant-voltage mode, wherein the controller is further configured to: transition from the constant-voltage mode to a constant-power mode in response to the output current being greater than a maximum current of the constant-voltage mode; control the cycling of the power switch to regulate the output current to equal a first constant current while the output voltage of the switching power converter is within a first voltage range, wherein the first constant current is greater than the maximum current by a discrete current step, and calculate a first constant-power reference voltage by a division of a constant power of the constant-power mode by the first constant current, wherein the first voltage range includes the first constant-power reference voltage.

Finally, in accordance with another aspect of the disclosure, a switching power converter is provided that includes: a transformer having a primary winding and a secondary winding, wherein the secondary winding is coupled to an output node for an output voltage; a power switch in series with the primary winding; and a controller configured to: control a cycling of the power switch to regulate an output current of the switching power converter to equal a maximum constant current during a constant-current mode; transition from the constant-current mode to a constant-power mode in response to the output voltage being greater than a maximum voltage of the constant-current mode; control the cycling of the power switch to regulate the output current to equal a first constant current while the output voltage of the switching power converter is within a first voltage range, wherein the first constant current is less than the maximum constant current by a discrete current step, and calculate a first constant-power reference voltage by a division of a constant power of the constant-power mode by the first constant current, wherein the first voltage range includes the first constant-power reference voltage.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
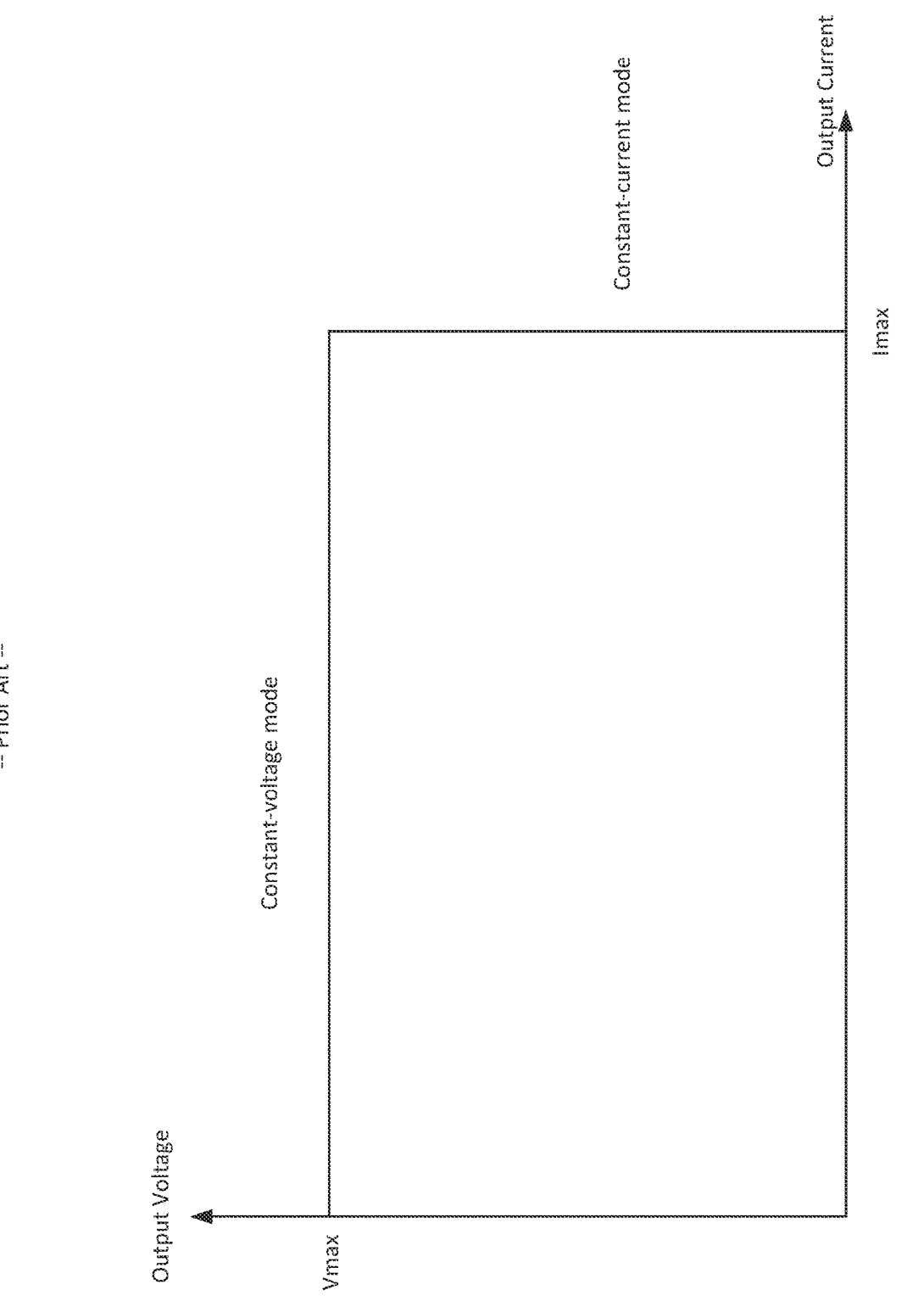
FIG. 1 shows the current and voltage output waveform for a flyback converter transitioning between a constant-voltage mode and a constant-current mode.

A switching power converter is provided with an advantageous digital control of the constant-power mode. The digital control is readily implemented and stable as compared to an analog constant-power mode. In this digital control, a constant power output is approximated by discrete steps of either the output voltage or the output current. The desired constant output power is thus approximated by either digitally incrementing/decrementing either the output voltage or the output current. For example, suppose that the output voltage is incremented or decremented by discrete voltage steps during the constant-power mode. At each discrete voltage step, a cycling of a power switch is controlled to regulate the output voltage to be constant at its incremented/decrement value but the output current may vary in an analog fashion within a current range. The center of this current range equals a constant-power reference current that equals the constant output power of the constant-power mode divided by the incremented (or decremented) output voltage. It may thus be appreciated that when the output current equals the constant-power reference current, the output power equals the desired constant power. Should the output current vary to no longer be within the current range, the output voltage is either decremented or incremented depending upon the error between the output current and the desired current range.

If instead the output current is digitally incremented/decremented by discrete current steps, the output voltage may vary within a voltage range as the output current is maintained constant at its incremented/decremented value. For each incremented/decremented value, the center of the corresponding voltage range equals a constant-power reference voltage that equals the constant output power divided by the incremented (or decremented) output current. It may thus be appreciated that when the output voltage equals the constant-power reference voltage, the output power equals the desired constant power. The choice between whether the output voltage or the output current is digitally varied depends upon whether it is desired to minimize the output voltage ripple or the output voltage current ripple during the constant-power mode.

The resulting digital control may be implemented in either a secondary-side or a primary-side controller. As implied by the name, a secondary-side controller resides on the secondary-side of the switching power converter's transformer. Conversely, a primary-side controller is situated on the primary-side of the transformer. Note that a primary-side controller is isolated from the output voltage and the output current by the transformer. In contrast, a secondary-side controller may directly sense both the output voltage and the output current. Since both the output voltage and the output current must be measured in the digital control disclosed herein, the following discussion will thus focus on a secondary-side controller implementation although it will be appreciated that a primary-side implementation of the digital control may also be implemented.

Figure 3:
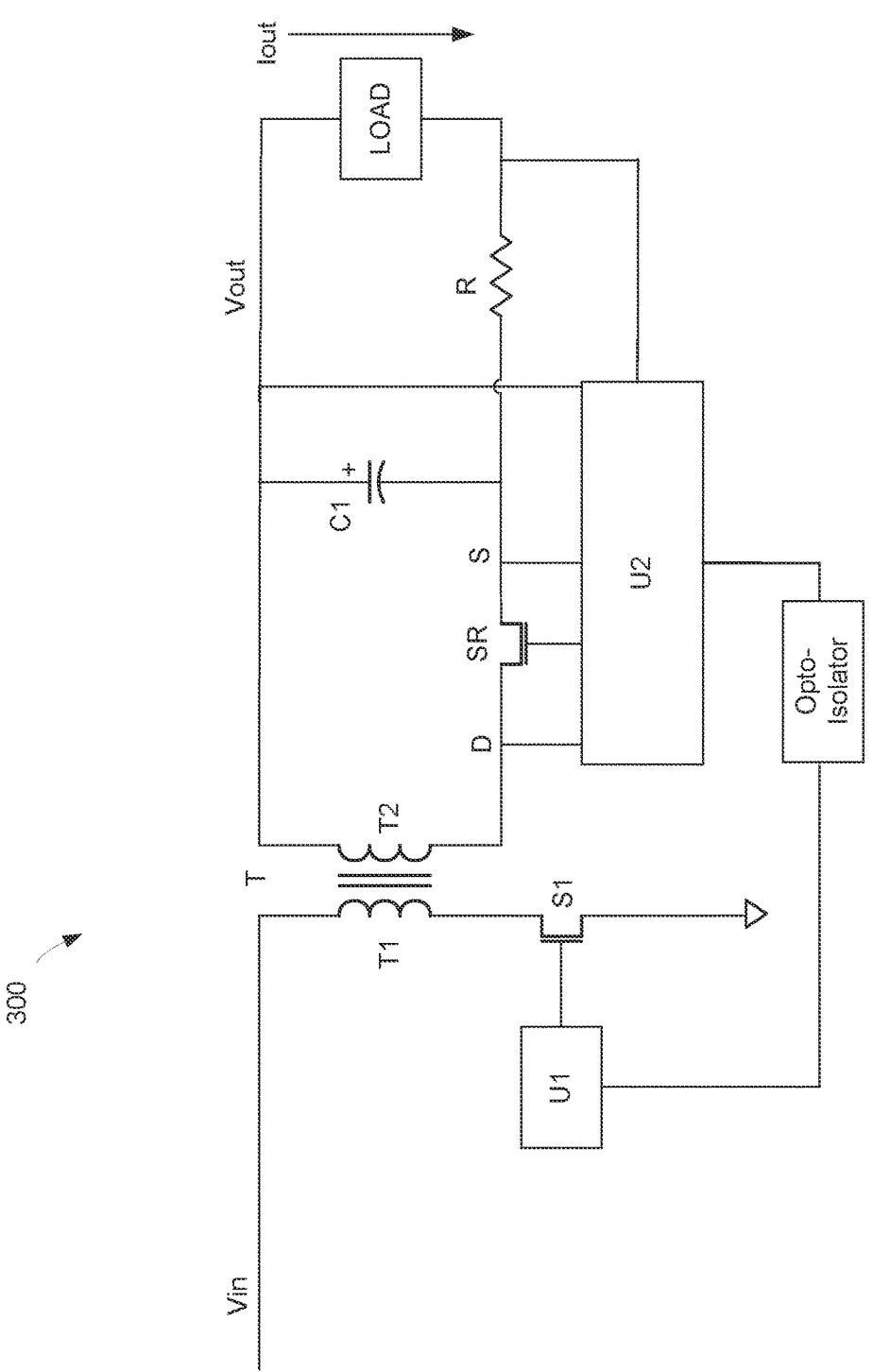
FIG. 3 shows a flyback converter that is configured with a digitally-controlled constant-power mode in accordance with an aspect of the disclosure.

An example flyback converter 300 with a secondary-side controller implementation of the digital control of the constant-power mode is shown in FIG. 3. A primary side controller U1 controls the cycling of a power switch transistor S1 responsive to a received control signal (e.g., a received control signal voltage) from an optocoupler 110. The power switch transistor S1 is coupled between ground and a primary winding T1 for a transformer T. In each cycle, an input voltage Vin such as from the rectification of an AC mains voltage drives a primary current into the primary winding while the power switch transistor S1 is on. While the primary current flows, a secondary controller U2 maintains a synchronous rectifier (SR) switch transistor off. For example, the secondary controller U2 may monitor a drain

5

6

(D) to source(S) voltage of the SR switch transistor to determine when the primary winding current conducts. After a sufficient amount of magnetic energy is stored in the transformer T1, the primary side controller U1 shuts off the power switch transistor S1. The secondary controller U2 senses this shut off and switches on the SR switch transistor accordingly to cause a secondary winding T2 of the transformer T to conduct so as to charge an output capacitor CI with an output voltage Vout and to conduct an output current Iout to a load (e.g. a mobile device battery). In alternative embodiments, the SR switch transistor may be replaced by an output diode D1.

To control whether a constant-voltage, a constant-current, or a constant-power mode is active, the secondary side controller U2 directly senses the output voltage Vout. In addition, the secondary side controller U2 may sense the output current Iout by sensing the voltage across a sense resistor R and converting this voltage to a current through Ohm's law. Referring again to FIG. 2, the secondary side controller U2 regulates the output voltage Vout in the constant-voltage mode while the output current Iout is less than IP1. Similarly, the secondary side controller U2 regulates the output current Iout in the constant-current mode while the output voltage Vout is less than VP2. Since those modes are conventional, the following discussion will focus on the constant-power mode.

Note that there are an essentially infinite number of voltage-current combinations that satisfy a constant output power because the output power is a product of the output voltage and the output current. As one of the output voltage or the output current increases, the other must decrease and vice versa to satisfy the constant power requirement. Such an infinite number of possibilities lead to design complexity in previous constant power regulation attempts. But that complexity is relieved herein by a digital technique that digitally varies either a reference voltage or a reference current. The voltage/current that is digitally varied is referred to herein as the digitally-varied reference signal. As used herein, a digitally-varied reference signal is either incremented or decremented by discrete steps. For example, a reference voltage is changed by positive or negative multiples of a voltage step ($\Delta V$). Similarly, a reference current changes according to positive or negative multiples of a current step ($\Delta I$). The following discussion will first address an implementation in which a reference voltage is the digitally-varied reference signal followed by a discussion of an implementation in which a reference current is the digitally-varied reference signal.

A transition from the constant-voltage mode to the constant-power mode is triggered by the secondary-side controller U2 sensing that the output current has exceeded an output current limit. Prior to this transition, a feedback loop regulated the output voltage to a constant voltage (CV) in which an error signal was generated in the feedback loop with respect to a difference between the output voltage and a CV reference voltage. It is thus convenient for the secondary-side controller U2 to subtract a voltage increment $\Delta V$ from the CV reference voltage to calculate an initial value for a constant-power (CP) reference voltage in the transition to the CP mode. The secondary-side controller U2 may then calculate a CP reference current by dividing the constant power by the CP reference voltage. By monitoring whether the output current is greater than the CP reference current by a threshold amount or less than the CP reference current by the threshold amount, the secondary-side controller U2 increments or decrements the CP reference voltage accordingly.

Figure 4:
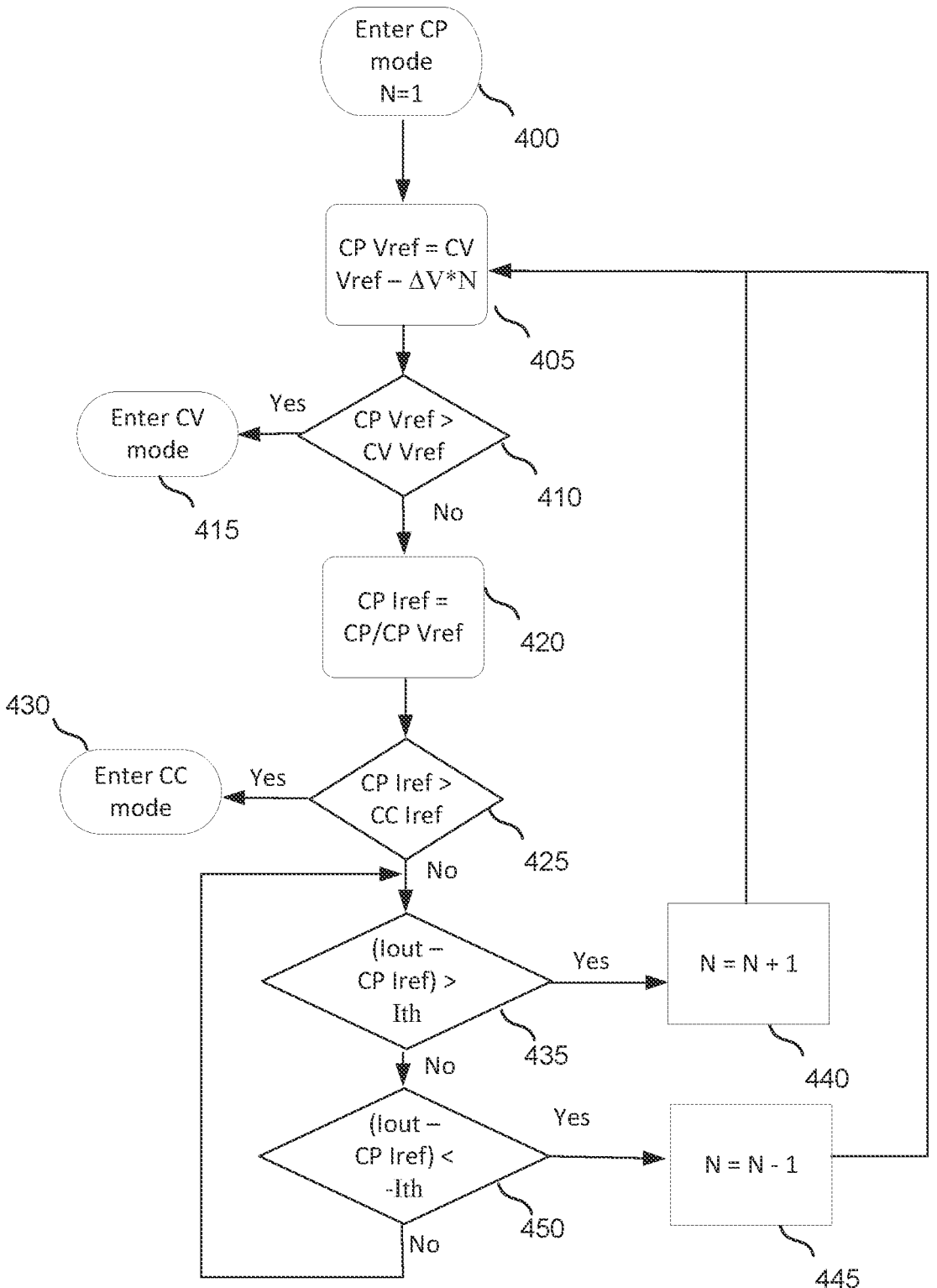
FIG. 4 is a flowchart for a method of a transition from a constant-voltage mode to a constant-power mode in which the output voltage is digitally varied in accordance with an aspect of the disclosure.

A flowchart for the reference voltage and reference current computation by the secondary-side controller U2 in a transition from the constant-voltage mode to the constant-power mode is shown in FIG. 4. At a transition 400 to the CP mode from the CV mode, a variable N is set to one. In a computation step 405, the secondary-side controller U2 computes a CP reference voltage (CP Vref) by subtracting N*$\Delta V$ from the CV reference voltage (CV Vref), where $\Delta V$ is the voltage step discussed above. Since the CP reference voltage may either be incremented or decremented, the secondary-side controller U2 tests in a step 410 whether the CP reference voltage is greater than the CV reference voltage. If this test is positive, the secondary-side controller U2 transitions back to the CV mode in a step 415. If step 410 is negative, the secondary-side controller U2 divides a constant power (CP) of the constant-power mode with the CP reference voltage to calculate a CP reference current (CP Iref) in a step 420. With the CP reference current calculated, the secondary-side controller U2 checks in a step 425 whether the CP reference current is greater than the constant-current reference current (CC Iref) that is used during the constant-current mode. Should the CP reference current be greater than the CC reference current, the secondary-side controller U2 transitions to the constant-current mode in a step 430. Otherwise, the secondary-side controller U2 tests whether a difference between the output current (Iout) and the CP reference current is greater than a positive threshold Ith in a step 435. If the output current is greater, the secondary-side controller U2 increments the variable N in a step 440, whereupon the control reverts back to step 405 such that the CP reference voltage is decremented. But if the output current is not greater, the secondary-side controller U2 proceeds to test whether the difference between the output current and the CP reference current is less than a negative threshold-Ith in a step 450. If result of step 450 is positive, the secondary-side controller U2 proceeds to decrement the variable N in a step 445, whereupon the control reverts back to step 405 such that the CP reference voltage is incremented. If the result of step 450 is negative, the control reverts back to step 435.

Referring again to step 405, note that once the secondary-side controller U2 has calculated the CP reference voltage, the secondary-side controller U2 generates a control voltage such that the output voltage is regulated to equal the CP reference voltage for the period of time in which the CP reference voltage is neither incremented nor decremented. In that regard, secondary-side controller U2 may perform steps 435 and 440 by integrating the current error (the difference between the output current and the CP reference current) over an integration period. Should this error change signs (change from positive to negative or from negative to positive), the integration period resets. The integration period would thus be the minimum length of time that the regulation of the output voltage would be with respect to a given setting of the CP reference voltage. The end result is that the output voltage over the CP mode would be an incremented or decremented responsive to the incrementing or decrementing of the CP reference voltage.

Figure 5:
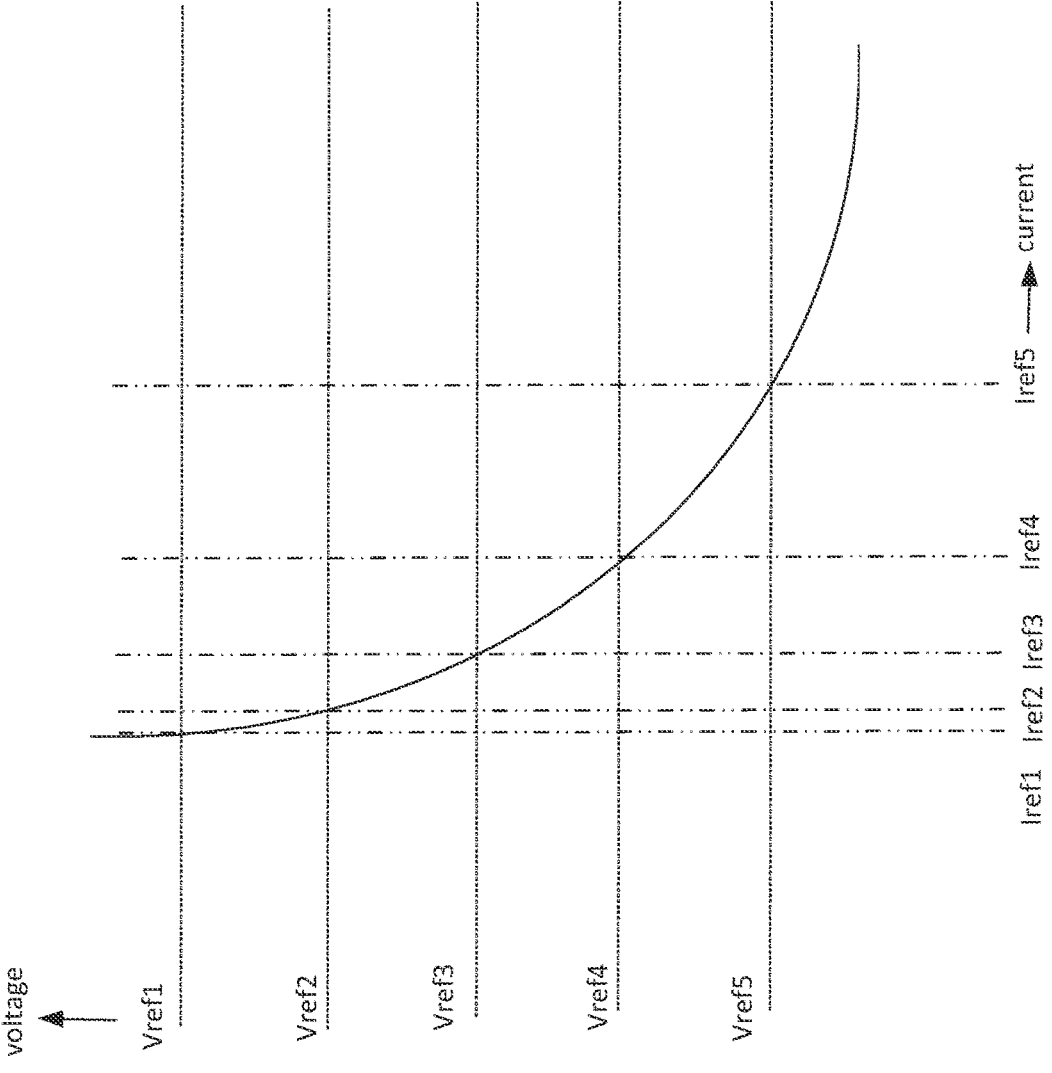
FIG. 5 illustrates the current and voltage output waveform for an analog constant-power mode and also the digitally-varied output voltages and corresponding constant-power reference currents in accordance with an aspect of the disclosure.

A plurality of example CP reference voltages and the corresponding CP reference currents are shown in FIG. 5. The example CP reference voltages descend in magnitude starting with a CP reference voltage Vref1. A second CP reference voltage Vref2 is thus $\Delta V$ less than Vref1. Similarly, a third CP reference voltage Vref3 is less than Vref2 by $\Delta V$, a fourth CP reference voltage Vref4 is less than Vref3 by $\Delta V$, and a fifth CP reference voltage Vref5 is less than Vref4 by $\Delta V$. The corresponding CP reference currents are designated as Iref1, Iref2, Iref3, Iref4, and Iref5, respectively. An ideal analog CP regulation curve transects through each Vref, Iref pair.

Figure 6:
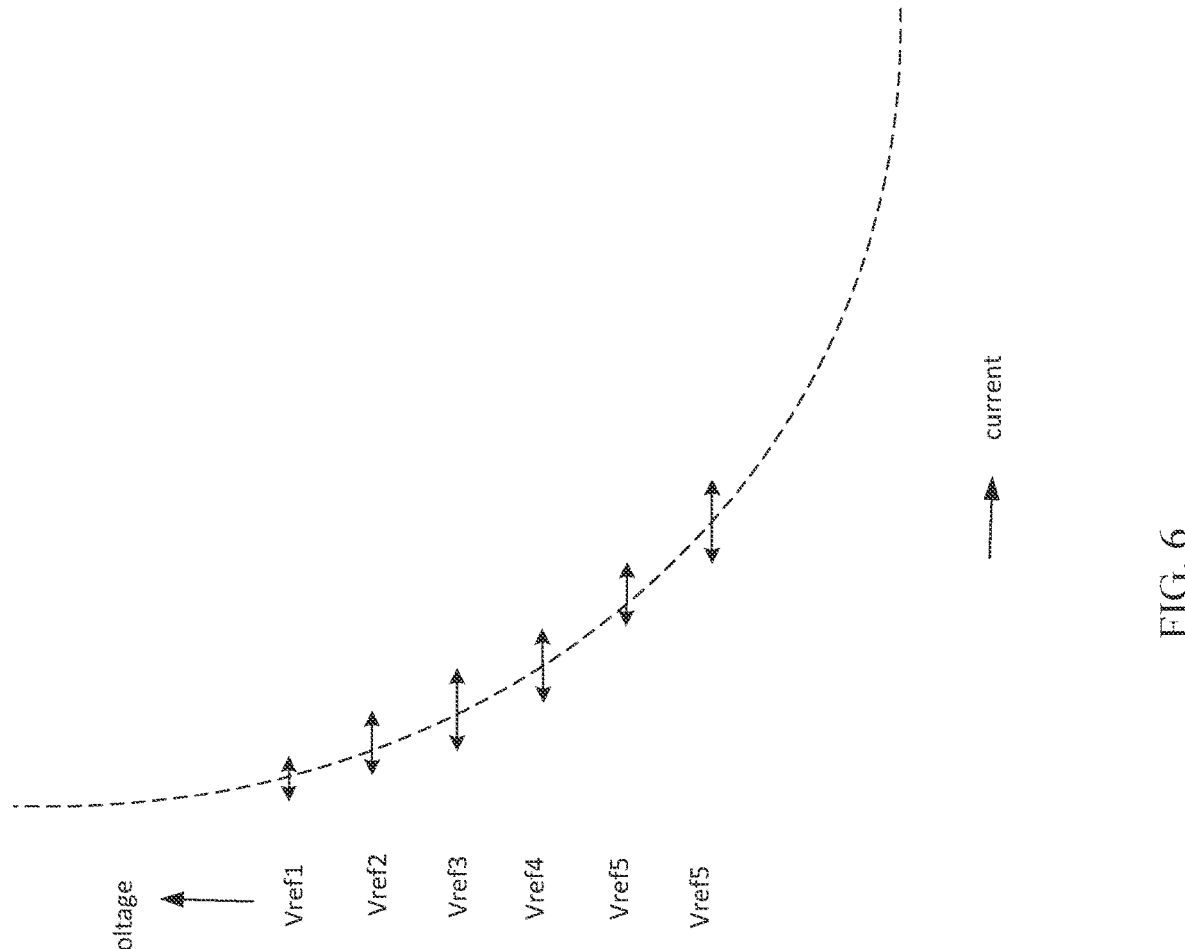
FIG. 6 illustrates the current and voltage output waveforms resulting from the method of FIG. 4 in accordance with an aspect of the disclosure.

This ideal CP regulation curve is advantageously approximated by regulating the output voltage over the series of example CP reference voltages Vref1 through Vref5 as shown in FIG. 6. While a given CP reference voltage is used to generate a control voltage for the output voltage regulation, the output voltage is regulated in a CV fashion to equal the CP reference voltage. But this constant voltage regulation will only vary across an output current that is no less than the negative threshold amount $\Delta I$ than the corresponding CP reference current and that is no greater than the positive threshold amount $\Delta I$ than the corresponding CP reference current. For example, consider the constant-voltage regulation of the output voltage equaling Vref2. The corresponding CP reference current is Iref2. Thus, the output voltage only equals Vref2 while the output current error satisfies the inequality of $-Ith<$output current error$<Ith$ is satisfied. Should the output current error be less than $-Ith$, the output voltage regulation would transition to equal Vref1. If the output current error is greater than Ith, the output voltage regulate would transition to equal Vref3. Note that the value of Ith is a design choice as it leads to a tradeoff. As Ith is reduced, the approximation to the ideal CP curve become better and better but at the cost of more frequent transitions from one CP reference voltage to another.

Figure 2:
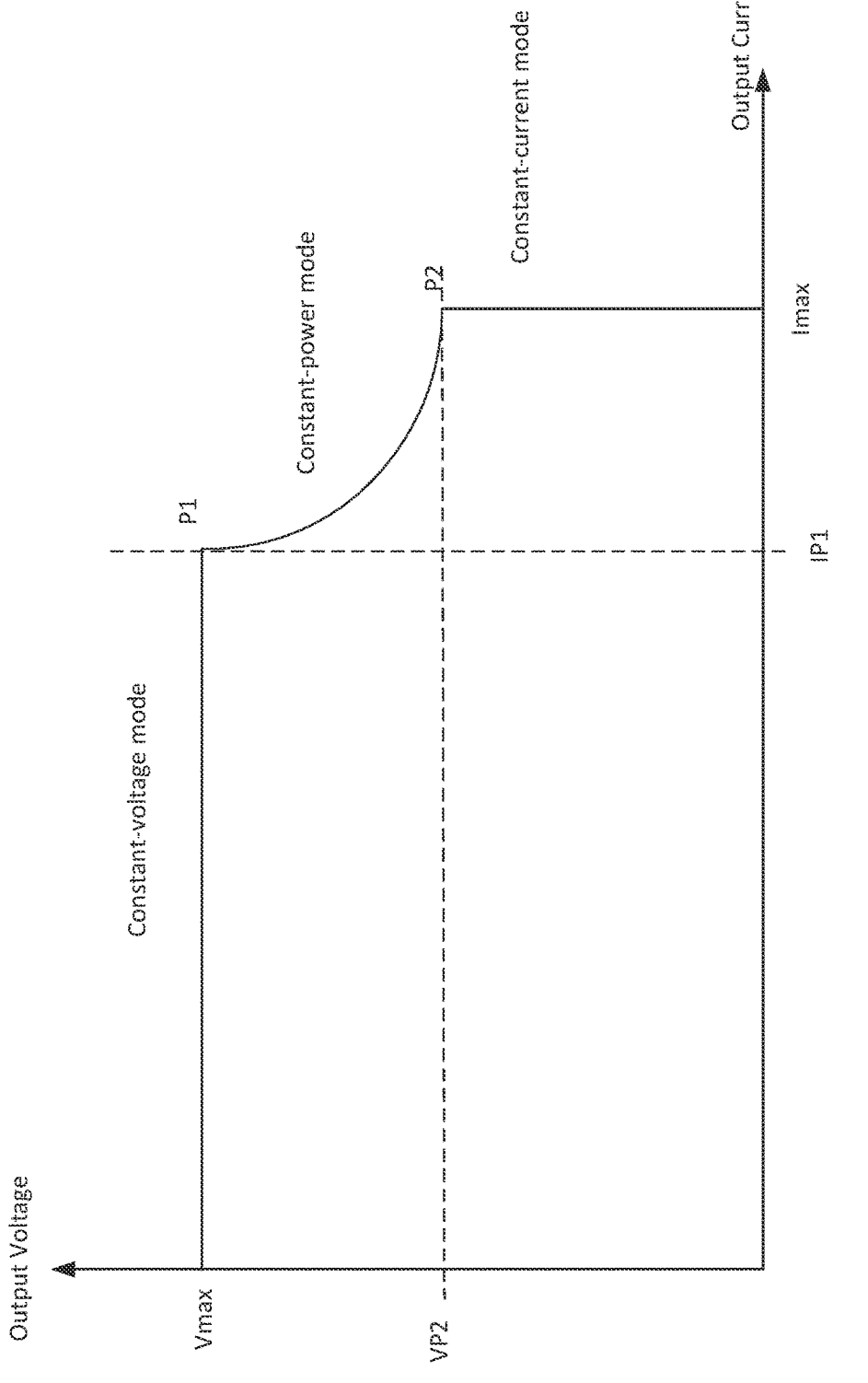
FIG. 2 shows the current and voltage output waveform for a flyback converter that transitions between a constant-voltage mode, an analog constant-power mode, and a constant-current mode.
Figure 7:
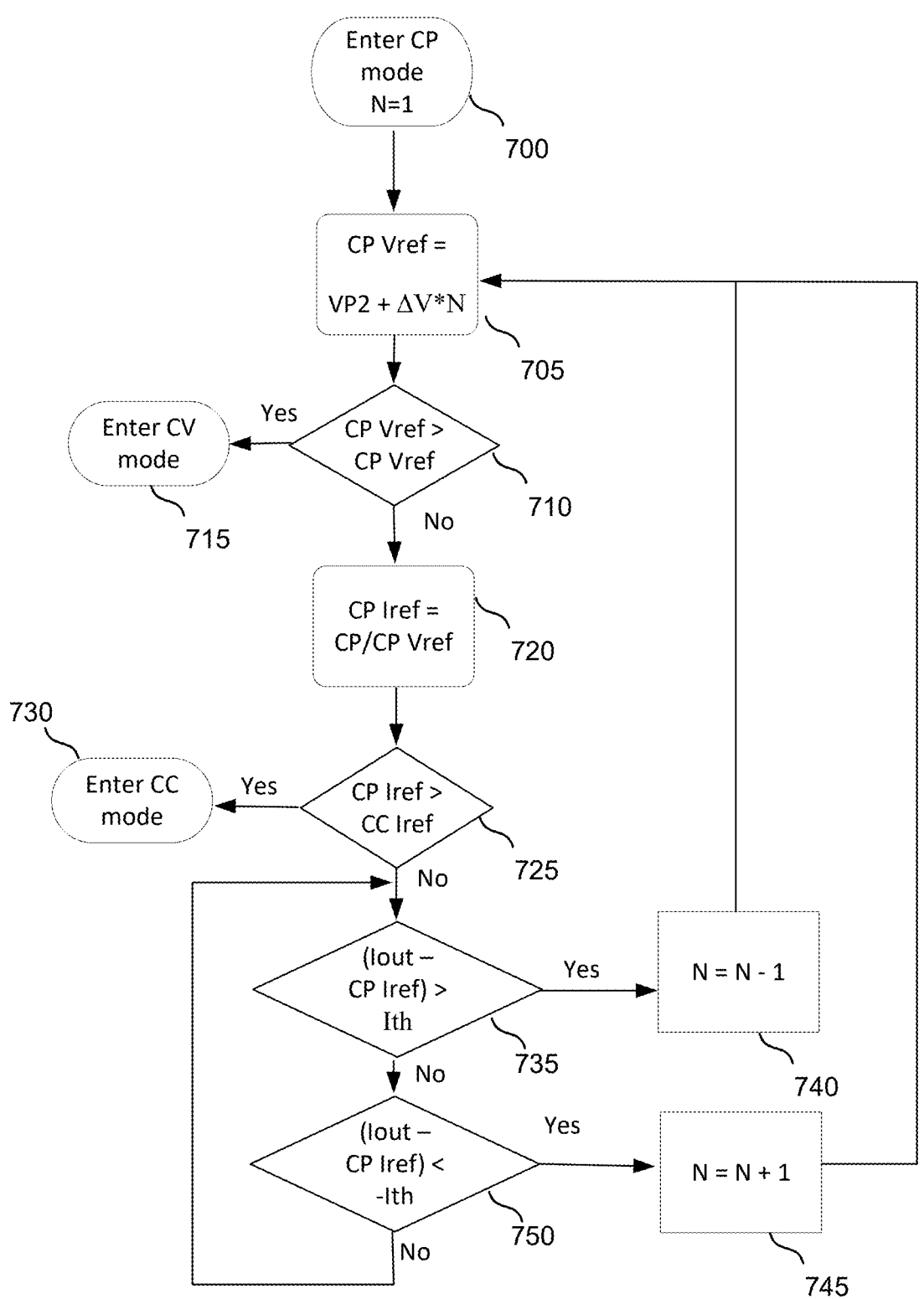
FIG. 7 is a flowchart for a method of a transition from a constant-current mode to a constant-power mode in which the output voltage is digitally varied in accordance with an aspect of the disclosure.

A flowchart for the transition from the CC mode to the CP mode is shown in FIG. 7. At a transition 700 to the CP mode from the CC mode, a variable N is set to one. In a computation step 705, the secondary-side controller U2 computes a CP reference voltage (CP Vref) by adding $N*\Delta V$ to the CC mode output voltage VP2 (FIG. 2). Since the CP reference voltage may either be incremented or decremented, the secondary-side controller U2 tests in a step 710 whether the CP reference voltage is greater than the CV reference voltage. If this test is positive, the secondary-side controller U2 transitions back to the CV mode in a step 715. If step 710 is negative, the secondary-side controller U2 divides a constant power (CP) of the constant-power mode with the CP reference voltage to calculate a CP reference current (CP Iref) in a step 720. With the CP reference current calculated, the secondary-side controller U2 checks in a step 725 whether the CP reference current is greater than the constant-current reference current (CC Iref) used during the constant-current mode. Should the CP reference current be greater than the CC reference current, the secondary-side controller U2 transitions to the constant-current mode in a step 730. Otherwise, the secondary-side controller U2 tests whether a difference between the output current (Iout) and the CP reference current is greater than a positive threshold Ith in a step 735. If the output current is greater, the secondary-side controller U2 decrements the variable N in a step 740, whereupon the control reverts back to step 705 such that the CP reference voltage is decremented. But if the output current is not greater, the secondary-side controller U2 proceeds to assess whether the difference between the output current and the CP reference current is less than a negative threshold $-Ith$ in a step 750. If result of step 750 is positive, the secondary-side controller U2 proceeds to increment the variable N in a step 745, whereupon the control reverts back to step 705 such that the CP reference voltage is incremented. If the result of step 750 is negative, the control reverts back to step 735.

Comparing the flowcharts of FIGS. 4 and 7, it may be seen that the difference between the two relates to the desired constant power behavior. In the transition from the CV mode to the CP mode and then from the CP mode to the CV mode, it may be seen that the output current must be gradually increased until it finally reaches the CC reference current limit. Step 740 is thus an incrementing of the variable N in response to an increase in the output current such that the CP reference voltage is decremented, which leads to the desired gradual increase in the output current. In contrast, during the transition from the CC mode to the CP mode and eventually to the CV mode, the output current is gradually decreasing to model the desired constant power behavior. Step 745 is thus an incrementing of the variable N is response to a decline in the output current such that the CP reference voltage is incremented, which leads to the desired gradual decrease in the output current.

Referring again to FIG. 3, note that the primary-side controller U1 may also implement the stepped constant-voltage digital emulation of an analog constant-power mode. For example, the primary-side controller U1 may sense the output voltage through primary-only feedback or through signaling from the secondary-side controller U2 such as through the optoisolator. Similarly, the primary-side controller U2 may sense the output current indirectly by sensing the primary-winding current through a sense resistor (not illustrated).

Regardless of whether the digital emulation of an analog constant-power mode is controlled by the secondary-side controller U2 or the primary-side controller U1, this control may involve a stepped constant-current regulation rather than a stepped constant-voltage regulation. In a stepped constant-current emulation of an analog constant-power mode, it is the CP reference current that is either incremented or decremented in digital steps. At each digital value of the CP reference current, the switching power converter proceeds to regulate the output current to equal the CP reference current. From the CP reference current, the switching power converter calculates a CP reference voltage by dividing the constant power (CP) by the CP reference current. Whether the CP reference current is then further incremented or decremented depends upon an error between the output voltage and the CP reference voltage.

Figure 8:
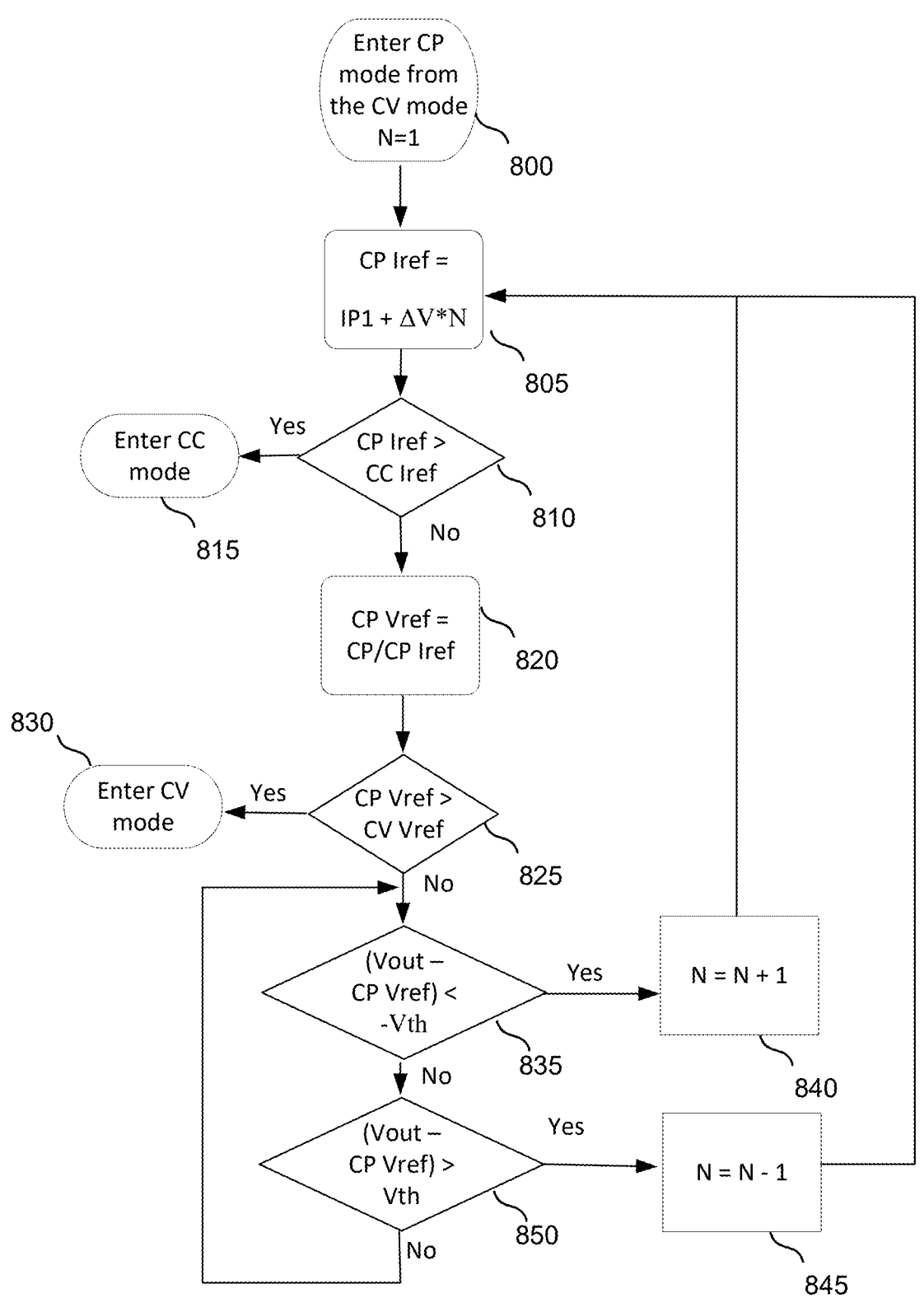
FIG. 8 is a flowchart for a method of a transition from a constant-voltage mode to a constant-power mode in which the output current is digitally varied in accordance with an aspect of the disclosure.

A flowchart for the CP reference voltage and CP reference current computation by the secondary-side controller U2 in a transition from the constant-voltage mode to the constant-power mode is shown in FIG. 8 for an implementation in which it is the CP reference current that is digitally varied. At a transition 800 to the CP mode from the CV mode, a variable N is set to one. In a computation step 805, the secondary-side controller U2 computes a CP reference current (CP Iref) by adding $N*\Delta I$ to the constant voltage current IP1 (FIG. 2), where $\Delta I$ is a current step analogous to the voltage step $\Delta V$ discussed above. Due to this incrementing, the secondary-side controller U2 tests in a step 810 whether the CP reference current is greater than the CC reference current (CC Iref). If this test is positive, the secondary-side controller U2 transitions back to the CC mode in a step 815. If step 810 is negative, the secondary-side controller U2 divides a constant power (CP) of the constant-power mode with the CP reference current to calculate a CP reference voltage (CP Vref) in a step 820. With the CP reference voltage calculated, the secondary-side controller U2 checks in a step 825 whether the CP reference voltage is greater than the constant-voltage reference voltage (CV Vref) that is used during the constant-voltage mode. Should the CP reference voltage be greater than the CV reference voltage, the secondary-side controller U2 transitions to the constant-voltage mode in a step 830. Otherwise, the secondary-side controller U2 tests whether a difference between the output voltage (Vout) and the CP reference voltage is less than a negative threshold-Vth in a step 835. If this difference is less than the negative threshold-Vth, the secondary-side controller U2 increments the variable N in a step 840, whereupon the control reverts back to step 805 such that the CP reference current is incremented. But if the difference is greater, the secondary-side controller U2 proceeds to test whether the difference between the output voltage and the CP reference voltage is greater than a positive threshold Vth in a step 850. If result of step 850 is positive, the secondary-side controller U2 proceeds to decrement the variable N in a step 845, whereupon the control reverts back to step 805 such that the CP reference current is decremented. If the result of step 850 is negative, the control reverts back to step 835.

Referring again to step 805, note that once the secondary-side controller U2 has calculated the CP reference current, the secondary-side controller U2 generates a control signal such that the output current is regulated to equal the CP reference current for the period of time in which the CP reference current is neither incremented nor decremented. In that regard, secondary-side controller U2 may perform steps 835 and 840 by integrating the voltage error (the difference between the output voltage and the CP reference voltage) over an integration period. Should this error change signs (change from positive to negative or from negative to positive), the integration period resets. The integration period would thus be the minimum length of time that the regulation of the output current would be with respect to a given setting of the CP reference current. The end result is that the output current over the CP mode would be an incremented or decremented responsive to the incrementing or decrementing of the CP reference current.

Figure 9:
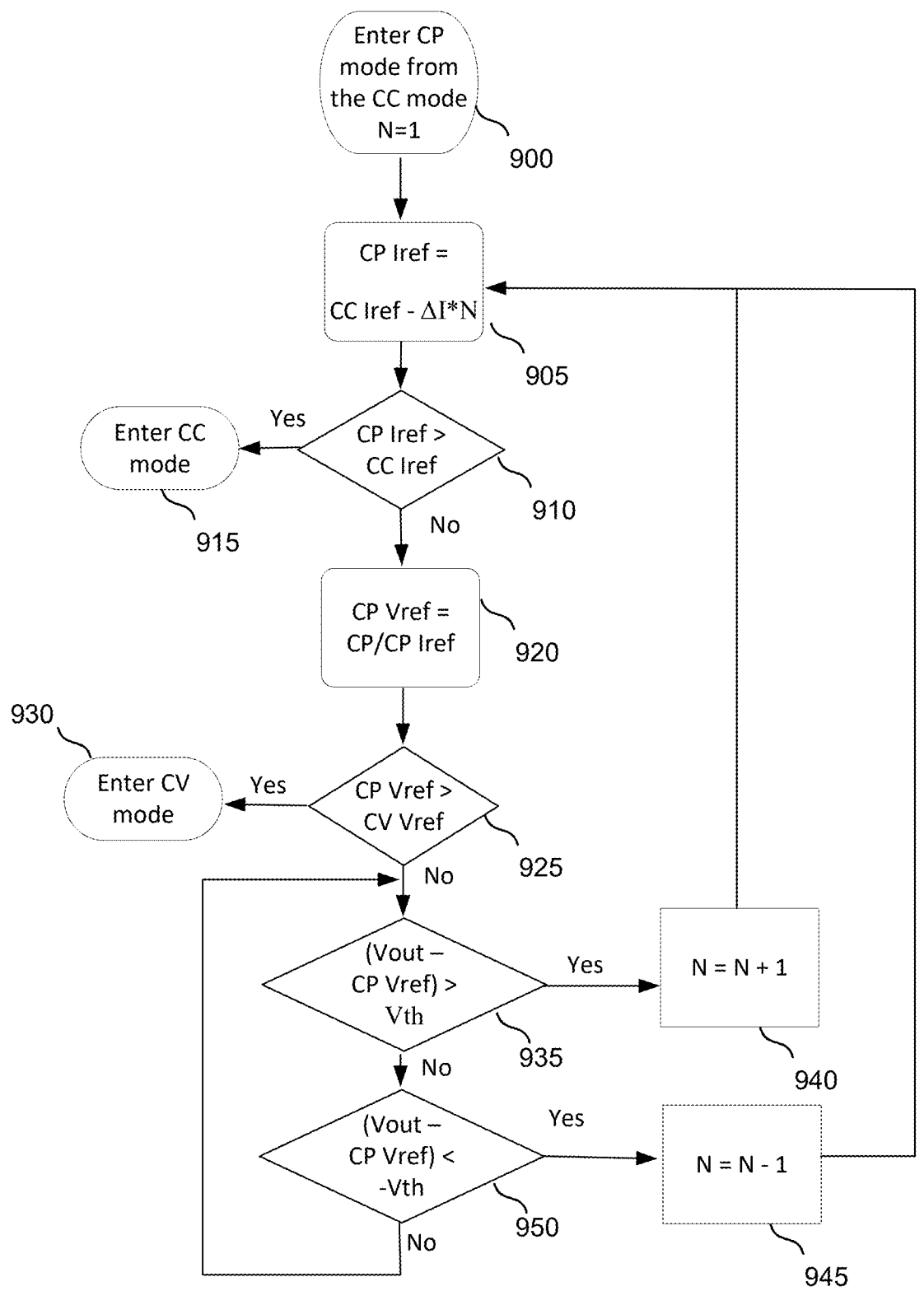
FIG. 9 is a flowchart for a method of a transition from a constant-current mode to a constant-power mode in which the output current is digitally varied in accordance with an aspect of the disclosure.

The transition from the CC mode to the CP mode in an implementation in which it is the CP reference current that is digitally varied is analogous as shown in the flowchart of FIG. 9. At a transition 900 to the CP mode from the CC mode, a variable N is set to one. In a computation step 905, the secondary-side controller U2 computes a CP reference current (CP Iref) by subtracting N*ΔI from the CC reference current. Since the variable N may also be decremented, the secondary-side controller U2 tests in a step 910 whether the CP reference current is greater than the CC reference current (CC Iref). If this test is positive, the secondary-side controller U2 transitions back to the CC mode in a step 915. If step 910 is negative, the secondary-side controller U2 divides a constant power (CP) of the constant-power mode with the CP reference current to calculate a CP reference voltage (CP Vref) in a step 920. With the CP reference voltage calculated, the secondary-side controller U2 checks in a step 925 whether the CP reference voltage is greater than the constant-voltage reference voltage (CV Vref) that is used during the constant-voltage mode. Should the CP reference voltage be greater than the CV reference voltage, the secondary-side controller U2 transitions to the constant-voltage mode in a step 930. Otherwise, the secondary-side controller U2 tests whether a difference between the output voltage (Vout) and the CP reference voltage is greater than a positive threshold Vth in a step 935. If this difference is greater than the threshold Vth, the secondary-side controller U2 increments the variable N in a step 940, whereupon the control reverts back to step 905 such that the CP reference current is decremented. But if the difference is less than positive threshold Vth, the secondary-side controller U2 proceeds to test whether the difference between the output voltage and the CP reference voltage is less than a negative threshold Vth in a step 950. If result of step 950 is positive, the secondary-side controller U2 proceeds to decrement the variable N in a step 945, whereupon the control reverts back to step 905 such that the CP reference current is incremented. If the result of step 950 is negative, the control reverts back to step 935.

Figure 10:
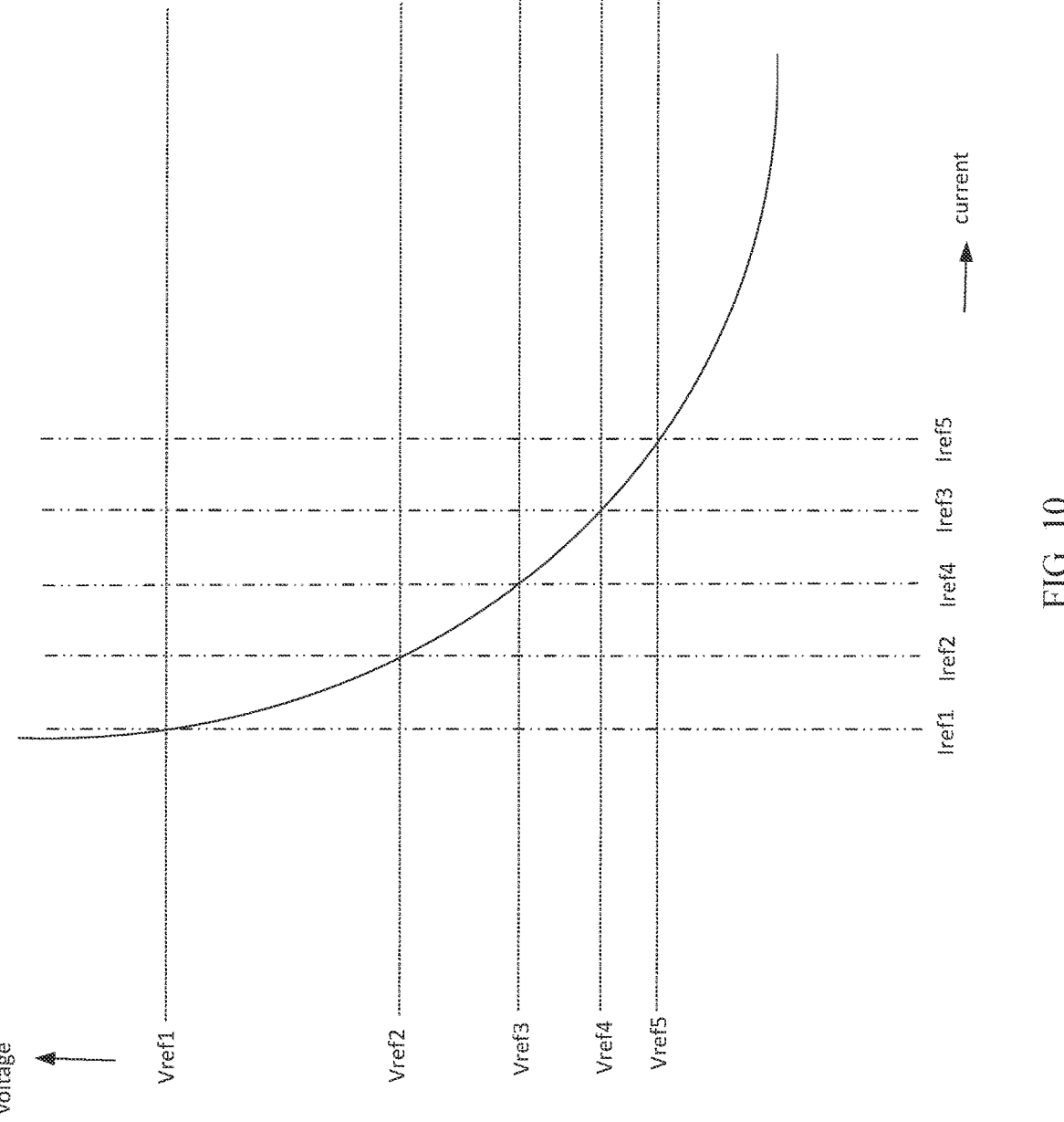
FIG. 10 illustrates the current and voltage output waveform for an analog constant-power mode and also the digitally-varied output currents and corresponding constant-power reference currents in accordance with an aspect of the disclosure.

A plurality of example digitally-varied CP reference currents and the corresponding CP reference voltages are shown in FIG. 10. The example CP reference currents ascend in magnitude starting with a CP reference current Iref1. A second CP reference current Iref2 is thus ΔI greater than Iref1. Similarly, a third CP reference current Iref3 is greater than Vref3 by ΔI, a fourth CP reference current Iref4 is greater than Iref3 by ΔI, and a fifth CP reference current Iref5 is less than Iref4 by ΔI. The corresponding CP reference voltages are designated as Vref1, Vref2, Vref3, Vref4, and Vref5, respectively. An ideal analog CP regulation curve transects through each Vref, Iref pair.

Figure 11:
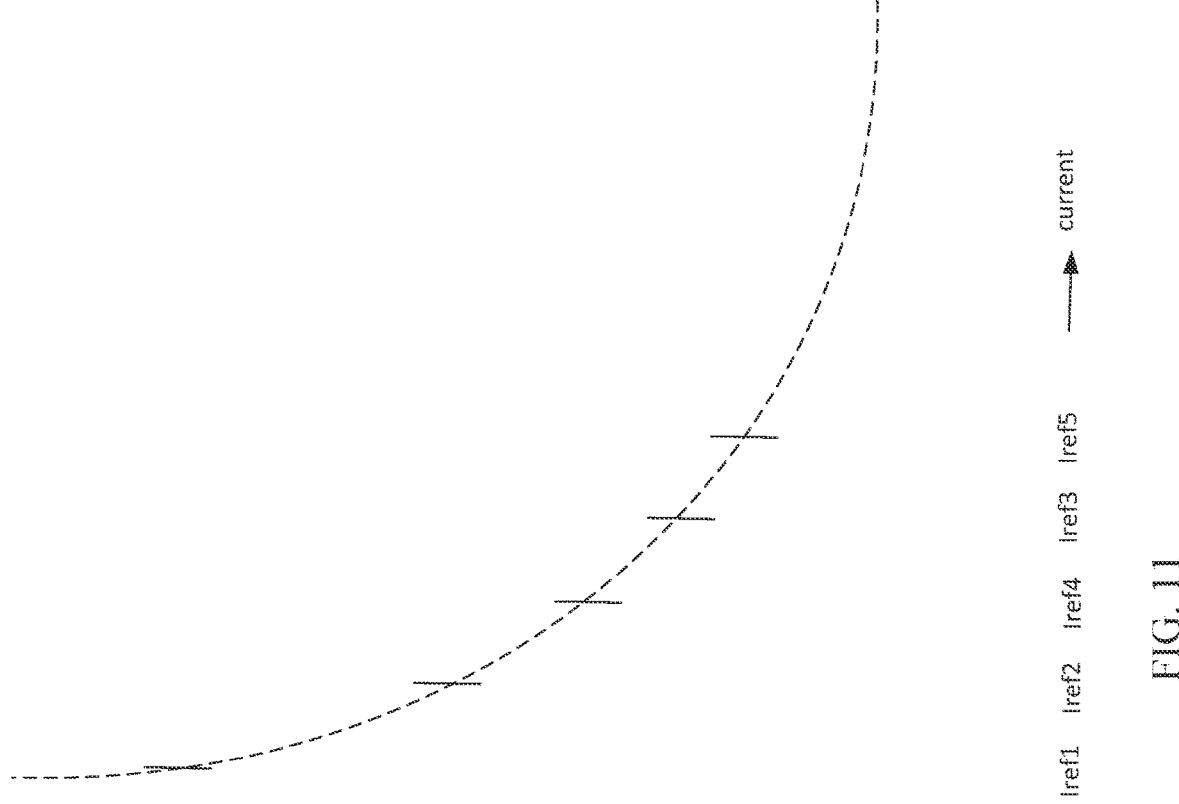
FIG. 11 illustrates the current and voltage output waveforms resulting from the method of FIG. 8 or 9 in accordance with an aspect of the disclosure.

This ideal analog CP regulation curve is advantageously approximated by regulating the output current with respect to the series of example CP reference currents Iref1 through Iref5 as shown in FIG. 11. While a given CP reference current is selected the output current is regulated in a CC fashion to equal the CP reference current. But during this constant current regulation, the output voltage will range from being no less than the negative threshold amount Vth below the corresponding CP reference voltage to being no greater than the positive threshold amount Vth above the corresponding CP reference voltage. For example, consider the constant-current regulation of the output current equaling Iref2. The corresponding CP reference voltage is Vref2. Thus, the output current only equals Iref2 while the output voltage error satisfies the inequality of −Vth<output voltage error<Vth is satisfied. Should the output voltage error be less than −Vth, the output current regulation would transition to equal Iref1. If the output voltage error is greater than Vth, the output current regulation would transition to equal Iref3. As discussed with regard to the threshold value Ith, the magnitude of the threshold voltage Vth is a design choice.

Referring again to FIG. 4, note that the initial value of the constant-power reference voltage after the transition from the constant-voltage mode to the constant-power mode may be denoted as a first constant voltage that is a threshold voltage increment less than the maximum voltage value of the output voltage during the constant-voltage mode. The corresponding constant-power reference current may be denoted as a first constant-power reference current. While the output voltage is regulated to equal the first constant voltage, the output current may vary in a first current range that extends from −ΔI below the constant-power reference current to ΔI above the constant-power reference current. Should the output current be greater than the first current range, the output voltage regulation transitions to equal a second constant voltage that is a threshold voltage increment less than the first constant voltage. In this fashion, the output voltage regulation may continue to vary to a third constant voltage, and so on. The threshold voltage increment from one constant voltage to another may be unequal such that a non-linear incrementing (or decrementing) may utilized in alternative implementations.

Referring again to FIG. 8, note that the initial value of the constant-power reference current after the transition from the constant-voltage mode to the constant-power mode may be denoted as a first constant current that is a threshold current increment greater than IP1. The corresponding constant-power reference voltage may be denoted as a first constant-power reference voltage. While the output current is regulated to equal the first constant current, the output voltage may vary in a first voltage range that extends from −ΔV below the constant-power reference current to ΔV above the constant-power reference voltage. Should the output voltage be less than the first voltage range, the output current regulation transitions to equal a second constant current that is a threshold current increment greater than the first constant current. In this fashion, the output current regulation may continue to vary to a third constant current, and so on. The threshold current increment from one constant current to another may be unequal such that a non-linear incrementing (or decrementing) may utilized in alternative implementations.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
a transformer having a primary winding and a secondary winding, wherein the secondary winding is coupled to an output node for an output voltage;
a power switch in series with the primary winding; and
a controller configured to:
control a cycling of the power switch to regulate the output voltage to equal a maximum voltage during a constant-voltage mode;
transition from the constant-voltage mode to a constant-power mode in response to an output current of the switching power converter being greater than a maximum current of the constant-voltage mode;
control the cycling of the power switch to regulate the output voltage to equal a first constant voltage while the output current of the switching power converter is within a first current range, wherein the first constant voltage is less than the maximum voltage by a discrete voltage step, and
calculate a first constant-power reference current by a division of a constant power of the constant-power mode by the first constant voltage, wherein the first current range includes the first constant-power reference current.

2. The switching power converter of claim 1, wherein the controller is a secondary-side controller coupled to the output node.

3. The switching power converter of claim 1, wherein the controller is a primary-side controller coupled to the power switch.

4. The switching power converter of claim 1, wherein the controller is further configured to:
decrement the first constant voltage by the discrete voltage step responsive to the output current of the switching power converter being greater than a maximum current of the first current range to provide a second constant voltage;
determine a second constant-power reference current by a division of the constant power by the second constant voltage; and
control the cycling of the power switch to regulate the output voltage to equal the second constant voltage while the output current of the switching power converter is within a second current range including the second constant-power reference current.

5. The switching power converter of claim 4, wherein the controller is further configured to:
decrement the second constant voltage by the discrete voltage step responsive to the output current of the switching power converter being greater than a maximum current of the second current range to provide a third constant voltage;
determine a third constant-power reference current by a division of the constant power by the third constant voltage; and
control the cycling of the power switch to regulate the output voltage to equal the third constant voltage while the output current of the switching power converter is within a third current range including the third constant-power reference current.

6. The switching power converter of claim 4, wherein the controller is further configured to:
increment the second constant voltage by the discrete voltage step responsive to the output current of the switching power converter being less than a minimum current of the second current range to provide a third constant voltage;
determine a third constant-power reference current by a division of the constant power by the third constant voltage; and
control the cycling of the power switch to regulate the output voltage to equal the third constant voltage while the output current of the switching power converter is within a third current range including the third constant-power reference current.

7. The switching power converter of claim 1, wherein the controller is further configured to:
transition to a constant-current mode in response to the output current of the switching power converter exceeding a reference current of the constant-current mode; and
control the cycling of the power switch to regulate the output current of the switching power converter to equal the reference current of the constant-current mode during the constant-current mode.

8. A switching power converter, comprising:
a transformer having a primary winding and a secondary winding, wherein the secondary winding is coupled to an output node for an output voltage;
a power switch in series with the primary winding;
a controller configured to control a cycling of the power switch so that an output current of the switching power converter equals a constant current during a constant-current mode;
transition from the constant-current mode to a constant-power mode in response to the output voltage being greater than a maximum voltage of the constant-current mode;
control the cycling of the power switch to regulate the output voltage to equal a first constant voltage while an output current of the switching power converter is within a first current range, wherein the first constant voltage is greater than the maximum voltage by a discrete voltage step, and
calculate a first constant-power reference current by a division of a constant power of the constant-power mode by the first constant voltage, wherein the first current range includes the first constant-power reference current.

9. The switching power converter of claim 8, wherein the controller is a secondary-side controller coupled to the output node.

10. The switching power converter of claim 8, wherein the controller is a primary-side controller coupled to the power switch.

11. The switching power converter of claim 8, wherein the controller is further configured to:

increment the first constant voltage by the discrete voltage step responsive to the output current of the switching power converter being less than a minimum current of the first current range to provide a second constant voltage;

determine a second constant-power reference current by a division of the constant power by the second constant voltage; and control the cycling of the power switch to regulate the output voltage to equal the second constant voltage while the output current of the switching power converter is within a second current range including the second constant-power reference current.

12. The switching power converter of claim 11, wherein the controller is further configured to:

increment the second constant voltage by the discrete voltage step responsive to the output current of the switching power converter being less than a minimum current of the second current range to provide a third constant voltage;

determine a third constant-power reference current by a division of the constant power by the third constant voltage; and control the cycling of the power switch to regulate the output voltage to equal the third constant voltage while the output current of the switching power converter is within a third current range including the third constant-power reference current.

13. The switching power converter of claim 11, wherein the controller is further configured to:

decrement the second constant voltage by the discrete voltage step responsive to the output current of the switching power converter being greater than a maximum current of the second current range to provide a third constant voltage;

determine a third constant-power reference current by a division of the constant power by the third constant voltage; and control the cycling of the power switch to regulate the output voltage to equal the third constant voltage while the output current of the switching power converter is within a third current range including the third constant-power reference current.

14. The switching power converter of claim 8, wherein the controller is further configured to:

transition to a constant-voltage mode in response to the output voltage exceeding a reference voltage of the constant-voltage mode; and control the cycling of the power switch to regulate the output voltage to equal the reference voltage of the constant-voltage mode during the constant-voltage mode.

15. A switching power converter, comprising:

a transformer having a primary winding and a secondary winding, wherein the secondary winding is coupled to an output node for an output voltage;

a power switch in series with the primary winding;

a controller configured to control a cycling of the power switch to regulate the output voltage to equal a maximum voltage during a constant-voltage mode, wherein the controller is further configured to:

transition from the constant-voltage mode to a constant-power mode in response to an output current of the switching power converter being greater than a maximum current of the constant-voltage mode;

control the cycling of the power switch to regulate the output current of the switching power converter to equal a first constant current while the output voltage of the switching power converter is within a first voltage range, wherein the first constant current is greater than the maximum current by a discrete current step, and calculate a first constant-power reference voltage by a division of a constant power of the constant-power mode by the first constant current, wherein the first voltage range includes the first constant-power reference voltage.

16. The switching power converter of claim 15, wherein the controller is further configured to:

increment the first constant current by the discrete current step responsive to the output voltage being less than a minimum voltage of the first voltage range to provide a second constant current;

determine a second constant-power reference voltage by a division of the constant power by the second constant current; and control the cycling of the power switch to regulate the output current of the switching power converter to equal the second constant current while the output voltage is within a second voltage range including the second constant-power reference voltage.

17. The switching power converter of claim 15, wherein the controller is further configured to:

transition to a constant-current mode in response to the output current of the switching power converter being greater than a maximum constant current; and regulate the output current of the switching power converter to equal the maximum constant current during the constant-current mode.

18. A switching power converter, comprising:

a transformer having a primary winding and a secondary winding, wherein the secondary winding is coupled to an output node for an output voltage;

a power switch in series with the primary winding; and a controller configured to:

control a cycling of the power switch to regulate an output current of the switching power converter to equal a maximum constant current during a constant-current mode;

transition from the constant-current mode to a constant-power mode in response to the output voltage being greater than a maximum voltage of the constant-current mode;

control the cycling of the power switch to regulate the output current to equal a first constant current while the output voltage of the switching power converter is within a first voltage range, wherein the first constant current is less than the maximum constant current by a discrete current step, and calculate a first constant-power reference voltage by a division of a constant power of the constant-power mode by the first constant current, wherein the first voltage range includes the first constant-power reference voltage.

19. The switching power converter of claim 18, wherein the controller is further configured to:

decrement the first constant current by the discrete current step responsive to the output voltage being greater than a maximum voltage of the first voltage range to provide a second constant current;

determine a second constant-power reference voltage by a division of the constant power by the second constant current; and while the output voltage is within a second voltage range including the second constant-power reference voltage, control the cycling of the power switch to regulate the output current of the switching power converter to equal the second constant current.

20. The switching power converter of claim 18, wherein the controller is further configured to:

transition to a constant-voltage mode in response to the output voltage being greater than a maximum constant voltage; and regulate the output voltage of the switching power converter to equal the maximum constant voltage during the constant-voltage mode.

\* \* \* \* \*